United States Patent [19]

Ono et al.

[11] Patent Number: 4,593,494

[45] Date of Patent: Jun. 10, 1986

[54] CONSTRUCTION OF DOOR GLASS GUIDE IN MOTOR VEHICLE DOOR

[75] Inventors: Kenzi Ono, Toyota; Toshiyuki Ozawa, Aichi, both of Japan

[73] Assignee: Toyota Jidosha Kabushiki Kaisha, Japan

[21] Appl. No.: 717,803

[22] Filed: Mar. 29, 1985

[30] Foreign Application Priority Data

Apr. 5, 1984 [JP] Japan ............... 59-49896[U]

[51] Int. Cl.[4] ............................................. E05F 11/38
[52] U.S. Cl. ........................................ 49/374; 49/348; 49/502; 296/146
[58] Field of Search .............. 49/374, 375, 502, 428, 49/348; 296/146

[56] References Cited

U.S. PATENT DOCUMENTS 3,333,363  8/1967  Garvey .................. 49/374 X
3,703,053  11/1972  DeRees et al. ............. 49/375 X
4,417,419  11/1983  Rossie et al.

FOREIGN PATENT DOCUMENTS 3228707  2/1984  Fed. Rep. of Germany ...... 296/146

Primary Examiner—Kenneth Downey
Attorney, Agent, or Firm—Finnegan, Henderson, Farabow, Garrett & Dunner

[57] ABSTRACT

A construction of a door glass guide in a motor vehicle door, wherein the construction comprises guide rollers mounted at upper positions of front and rear end edges of a door glass, being shifted inwardly from the door glass and guide portions integrally formed on vertical members disposed at front and rear sides of a door frame, for vertically, slidably guiding the guide rollers, and the outer surface of a vehicle body is substantially flush with the outer surfaces of the door glass and the door frame, characterized in that the guide rollers are mounted at positions where the guide rollers come into abutting contact with the bottom end surface of a transverse member disposed at the upper side of the door frame when the door glass is fully closed.

16 Claims, 6 Drawing Figures

CONSTRUCTION OF DOOR GLASS GUIDE IN MOTOR VEHICLE DOOR

BACKGROUND OF THE INVENTION

1. Field of the Invention

This invention relates to a construction of a door glass guide in a motor vehicle door, and more particularly, to a construction of a door glass guide wherein up stoppers are improved in a motor vehicle door, in which the construction comprises guide rollers mounted at upper positions of front and rear end edges of a door glass, being shifted inwardly from the door glass and guide portions integrally formed on vertical members disposed at front and rear sides of a door frame, for vertically, slidably guiding the guide rollers, and the outer surface of a vehicle body is substantially flush with the outer surfaces of the door glass and the door frame.

2. Description of the Prior Art

As described in Japanese Patent Kokai (Laid-Open) No. 5217/81 and the like for example, there has heretofore been proposed a construction of a door glass guide in a motor vehicle door, wherein the construction comprises guide rollers mounted at upper positions of front and rear end edges of the door glass, being shifted inwardly from the door glass and guide portions integrally formed on vertical members disposed at front and rear sides of a door frame, for vertically, slidably guiding the guide rollers, and the outer surface of a vehicle body is substantially flush with the outer sufaces of the door glass and the door frame, so that an air resistance and wind whistle can be reduced during running of a motor vehicle at high speed and the aesthetic appearance of the vehicle can be improved.

In a so-called flush-surfaced motor vehicle door as described above, a door glass 1 may be inclined in the longitudinal direction as indicated by two-dot chain lines in FIG. 4 due to variabilities in dimensions of a door frame, a door glass guide mechanism and a door glass, and assemblings thereof.

As a means for correcting this inclination of the door glass 1, as shown in FIGS. 4 and 5 for example, there is such an arrangement that a pair of up stoppers 4 are mounted to front and rear bottom ends of the door glass 1 at positions lower than a beltline 3 of a door 2, up stopper retainers 6 opposed to the up stoppers 4 are mounted to a door inner reinforcement 5 in the door 2, and the up stoppers 4 about against the up stopper retainers 6 from below to be controlled in their upward displacement when the door glass 1 is fully closed, so that the door glass 1 can be prevented from being inclined.

In other words, in assembling the door glass 1, the positions of the up stopper retainers 6 are adjusted in the vertical dirction, to thereby prevent the door glass 1 from being inclined.

However, the above-described construction, wherein the up stoppers 4 are mounted to the door glass 1 and the up stoppers retainers 6 to the door inner reinforcement 5, respectively, presents such disadvantages that the number of parts and the manufacturing cost are increased, the assembling accuracy is not always satisfactory, and adjustment is needed in assembling the door glass 1.

Furthermore, since spaces are needed for assembling the up stoppers 4 and the up stopper retainers 6, the sectional area of the door inner reinforcement 5 must be reduced by these spaces accordingly. For this reason, such a disadvantage is presented that the section stiffness of the door inner reinforcement 5 may not be sufficient.

SUMMARY OF THE INVENTION

It is therefore the primary object of the present invention is to provide a construction of a door glass guide in a motor vehicle door, wherein the up stoppers and up stopper retainers can be dispensed with and the assembling accuracy can be improved.

To this end, the present invention contemplates that, in a construction of a door glass guide in a motor vehicle door, wherein the construction comprises guide rollers mounted at upper positions of front and rear end edges of a door glass, being shifted inwardly from the door glass and guide portions integrally formed on vertical members disposed at front and rear sides of a door frame, for vertically, slidably guiding the guide rollers, and the outer surface of a vehicle body is substantially flush with the outer surfaces of the door glass and the door frame, the guide rollers are mounted at positions where the guide rollers come into abutting contact with the bottom end surface of a transverse member disposed at the upper side of the door frame when the door glass is fully closed, so that the guide rollers can additionally function as the up stoppers and the transverse member disposed at the upper side of the door frame can additionally function as the up stopper retainers.

To the above end, the present invention contemplates that said guide portion is opened at the upper end thereof toward the bottom end surface of the transverse member.

To the above end, the present invention contemplates that said transverse member is provided with a door glass weather strip for sealing a space formed between the door glass and the door frame when the door glass is fully closed, and the door glass weather strip is extended to cover the bottom end surface of the transverse member.

To the above end, the present invention contemplates that said door glass weather strip is integrally provided thereon with an inner lip being in sliding edge of the door glass and being adjacent to the top end of the guide portions at the outer position thereof.

To the above end, the present invention contemplates that said transverse member is provided with a door glass weather strip for sealing a space formed between the door glass and the door frame when the door glass is fully closed, said door glass weather strip is integrally provided thereon with an inner lip being in sliding edge of the door glass and being adjacent to the top end of the guide portions at the outer position thereof.

To the above end, the present invention contemplates that said guide rollors are mounted on the door glass through through-holes formed in the door glass.

DETAILED DESCRIPTION OF THE PREFERRED EMBODIMENT

Detailed description will hereunder be given of one embodiment of the present invention with reference to the drawings.

Figure 1:
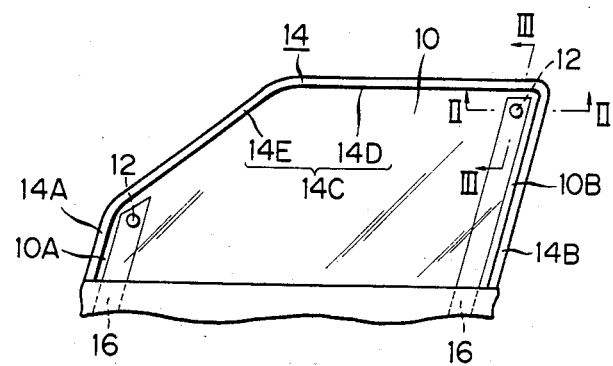
FIG. 1 is a schematic front view showing the construction of the door glass guide in a motor vehicle door according to the present invention.
Figure 2:
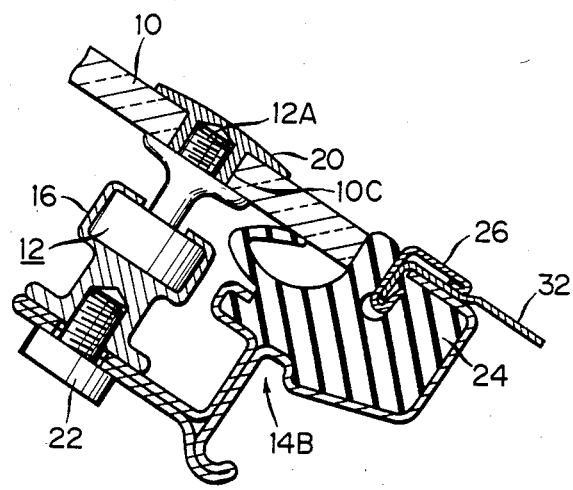
FIGS. 2 and 3 are enlarged sectional views taken along the lines II—II and III—III in FIG. 1.
Figure 3:
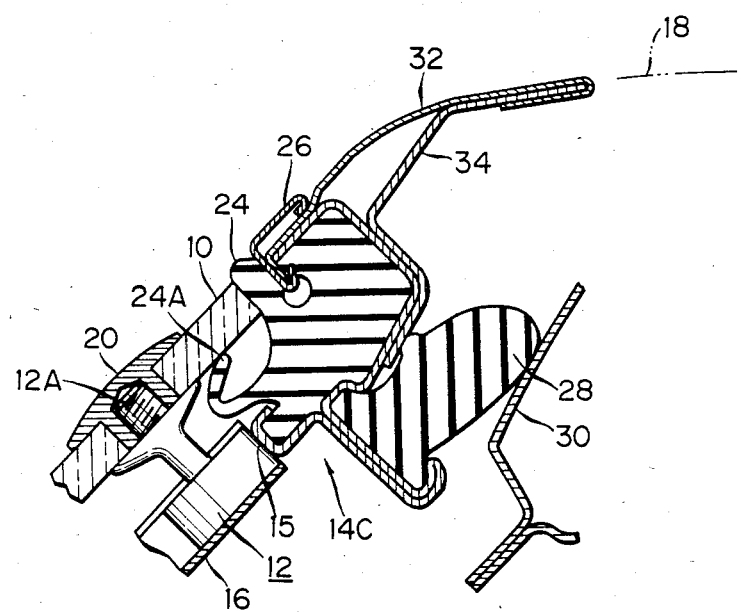

As shown in FIGS. 1 to 3, according to this embodiment, in a construction of a door glass guide in a motor vehicle door, wherein the construction comprises guide rollers 12 mounted at upper positions of front and rear end edges 10A and 10B of the door glass 10, being shifted inwardly from the door glass and guide portions 16 integrally formed on vertical members 14A and 14B disposed at front and rear sides of a door frame 14, for vertically, slidably guiding the guide rollers 12, and the outer surface of a vehicle body 18 is substantially flush with the outer surfaces of the door glass 10 and the door frame 14, the guide rollers 12 are mounted at positions where the guide rollers 12 come into abutting contact with the bottom end surface 15 of a transverse member 14C disposed at the upper side of the door frame when the door glass 10 is fully closed.

The transverse member 14C is including a horizontal portion 14D and a inclined portion 14E.

The guide roller 12 is provided at the outer end portion thereof with an externally threaded portion 12A, which is threadably coupled from inside to a nut 20 inserted from outside through a through-hole 10C formed in the door glass 10, whereby the guide roller 12 is mounted to the door glass 10.

Furthermore, the guide portion 16 is of a generally U-shape in cross section, into which the guide roller 12 is vertically and slidably coupled and is opened at the upper end thereof toward the bottom end surface 15 of the transverse member 14C.

This guide portions 16 are continuously and integrally formed on the front and rear end edges 10A and 10B, and tightened and fixed to the vertical members 14A and 15B of the door frame 14 through bolts 22 at suitable positions in the vertical direction.

Designated at 24 in FIGS. 2 and 3 is a door glass weather strip for sealing a space formed between the door glass 10 and the door frame 14 when the door glass 10 is fully closed, and this door glass weather strip 24 is integrally provided thereon with an inner lip 24A being in sliding contact with the inner surface of the front or rear end edge 10A or 10B of the door glass 10 and being adjacent to the top end of the guide portion 16 at the outer position thereof.

Furthermore, designated at 26 in FIGS. 2 and 3 is a door frame molding, denoted at 28 in FIG. 3 is a door weather strip for sealing a space formed between the door and the vehicle body when the door is fully closed, 30 a roofside rail, which is brought into contact with the door weather strip 28 of the transverse member 14C of the door frame 14, 32 a door outer panel, and 34 a door frame reinforcement, respectively.

In this embodiment, during the full closing of the door glass 10, when the upper end of the rear end edge 10B of the door glass 10 comes into abutting contact with the transverse member 14C of the door frame 14 through the door glass weather strip 24, the guide roller 12 comes into abutting contact with the bottom end surface 15 of the transverse member 14C simultaneously.

In consequence, the inclination of the door glass 10 in the longitudinal direction can be corrected without providing the up stoppers, the up stopper retainers and the like separately.

Here, the door frame 14 including the transverse member 14C is normally formed of a rolled product, which is welded to the door body, whereby the dimensions and the assembling accuracy thereof are satisfactory. Moreover, as for the through-hole 10C for mounting the guide roller 12, which is formed in the door glass 10, since the door glass 10 is a single part and the drilling operation is easily performed, the accuracies in position and hole diameter of the through-hole 10C are generally satisfactory.

In consequence, adjustment during assembling of the door glass 10 can be omitted.

Further, in the above embodiment, the inner lip 24A is adjacent to the top end of the guide portion 16 at the outer position thereof, whereby the outer surface of the top end of the guide portion 16 is covered by the inner lip 24A and aesthetic appearance of the door is improved.

Additionally, in the above embodiment, each of the guide portions 16 is formed into a member of a generally U-shape in cross section, having an opening directed to the outside of the vehicle body, and each of the guide rollers 12 is formed at a position shifted relative to the guide portion 16 from the inner surface of the door glass toward the compartment, however, the present invention need not necessarily be limited to this embodiment, and, for example, the guide roller 12 may be a member bent into a generally L-shape in cross section and shifted from the inner surfacae of the door glass 10 toward the compartment and the guide portion may be a guide groove being opened towartd the center of the door glass, for being engaged with the forward end portion of the aforesaid L-shape.

Namely, the present invention is normally applied to the construction of the door glass guide having the guide mechanism for vertically guiding the door glass 10 at the positions shifted from the door glass 10 toward the interior of the compartment.

Furthermore, in the above embodiment, the guide roller 12 come directly into abutting contact with the bottom end surface 15 of the transverse member 14C for the door frame 14 when the door glass 10 is fully closed, however, the guide rollers may be replaced by ones only if they can substantially come into abutting contact with the transverse member 14C and another member formed integrally therewith.

Figure 4:
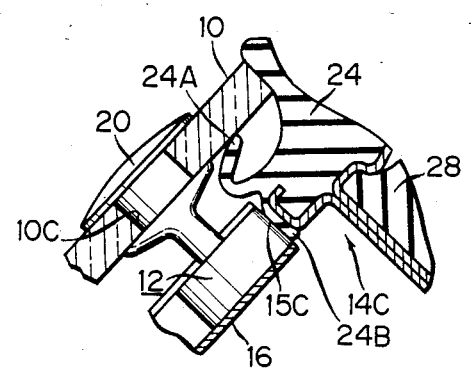
FIG. 4 is a sectional view of a main part of a second embodiment of the present invention.
Figure 5:
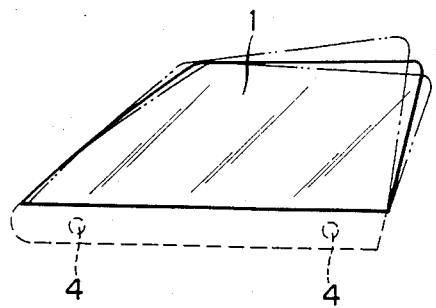
FIG. 5 is a schematic front view showing the inclined state of the door glass in the conventional motor vehicle door.
Figure 6:
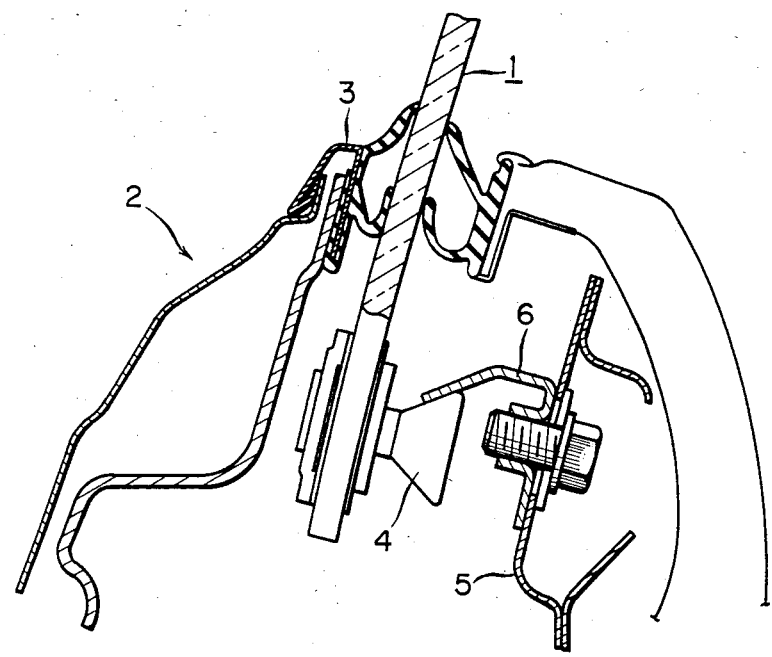
FIG. 6 is a sectional view showing the up stopper mechanism in the conventional motor vehicle door.

In consequence, for example, such an arrangement may be adopted that, as shown in FIG. 4, the door glass weather strip 24 is extended to cover the bottom end surface 15 of the transverse member and the guide roller 12 abut against this extended portion 24B from below.

What is claimed is:

1. A construction of a door glass guide in a motor vehicle door, wherein said construction comprises guide rollers mounted at upper positions of front and rear end edges of a door glass, being shifted inwardly from the door glass and guide portions integrally formed on vertical members disposed at front and rear sides of a door frame, for vertically, slidably guiding said guide rollers, and the outer surface of a vehicle body is substantially flush with the outer surfaces of said door glass and said door frame, characterized in that said guide rollers are mounted at positions where said guide rollers come into abutting contact with the bottom end surface of a transverse member disposed at the upper side of said door frame when said door glass is fully closed.

2. A construction of a door glass guide in a motor vehicle door as set forth in claim 1, wherein said guide portion is opened at the upper end thereof toward the bottom end surface of the transverse member.

3. A construction of a door glass guide in a motor vehicle door as set forth in claim 1, wherein said transverse member is provided with a door glass weather strip for sealing a space formed between the door glass and the door frame when the door glass is fully closed, and the door glass weather strip is extended to cover the bottom end surface of the transverse member.

4. A construction of a door glass guide in a motor vehicle door as set forth in claim 2, wherein said transverse member is provided with a door glass weather strip for sealing a space formed between the door glass and the door frame when the door glass is fully closed, and the door glass weather strip is extended to cover the bottom end surface of the transverse member.

5. A construction of a door glass guide in a motor vehicle door as set forth in claim 3, wherein said door glass weather strip is integrally provided thereon with an inner lip being in sliding edge of the door glass and being adjacent to the top end of the guide portions at the outer position thereof.

6. A construction of a door glass guide in a motor vehicle door as set forth in claim 4, wherein said door glass weather strip is integrally provided thereon with an inner lip being in sliding edge of the door glass and being adjacent to the top end of the guide portions at the outer position thereof.

7. A construction of a door glass guide in a motor vehicle door as set forth in claim 1, wherein said transverse member is provided with a door glass weather strip for sealing a space formed between the door glass and the door frame when the door glass is fully closed, said door glass weather strip is integrally provided thereon with an inner lip being in sliding edge of the door glass and being adjacent to the top end of the guide portions at the outer position thereof.

8. A construction of a door glass guide in a motor vehicle door as set forth in claim 2, wherein said transverse member is provided with a door glass weather strip for sealing a space formed between the door glass and the door frame when the door glass is fully closed, said door glass weather strip is integrally provided thereon with an inner lip being in sliding edge of the door glass and being adjacent to the top end of the guide portions at the outer position thereof.

9. A construction of a door glass guide in a motor vehicle door as set forth in claim 1, wherein said guide rollers are mounted on the door glass through through-holes formed in the door glass.

10. A construction of a door glass guide in a motor vehicle door as set forth in claim 2, wherein said guide rollers are mounted on the door glass through through-holes formed in the door glass.

11. A construction of a door glass guide in a motor vehicle door as set forth in claim 3, wherein said guide rollers are mounted on the door glass through through-holes formed in the door glass.

12. A construction of a door glass guide in a motor vehicle door as set forth in claim 4, wherein said guide rollers are mounted on the door glass through through-holes formed in the door glass.

13. A construction of a door glass guide in a motor vehicle door as set forth in claim 5, wherein said guide rollers are mounted on the door glass through through-holes formed in the door glass.

14. A construction of a door glass guide in a motor vehicle door as set forth in claim 6, wherein said guide rollers are mounted on the door glass through through-holes formed in the door glass.

15. A construction of a door glass guide in a motor vehicle door as set forth in claim 7, wherein said guide rollers are mounted on the door glass through through-holes formed in the door glass.

16. A construction of a door glass guide in a motor vehicle door as set forth in claim 8, wherein said guide rollers are mounted on the door glass through through-holes formed in the door glass.

* * * * *